United States Patent Office 3,224,987
Patented Dec. 21, 1965

3,224,987
TRANSPARENT PRODUCTS FROM POLY-ε-CAPRO-
LACTAM AND PROCESS OF MAKING SAME
Jacob C. F. Kessler, Rozendaal, Netherlands, assignor to
American Enka Corporation, Enka, N.C., a corporation
of Delaware
No Drawing. Filed Apr. 26, 1961, Ser. No. 105,554
Claims priority, application Netherlands, May 10, 1960,
251,441
8 Claims. (Cl. 260—18)

The present invention relates to a process for the preparation of a molding material formed from poly-ε-caprolactam and to the products manufactured therefrom.

Molded articles, filaments, fibers, films, and the like prepared normally from poly-ε-caprolactam often have the disadvantage that they are objectionable from the standpoint of appearance, in that they are non-transparent and/or milky.

It is therefore the object of the present invention to prepare a material of poly-ε-caprolactam which can be molded into a transparent product having a non-milky appearance.

The novel process contemplates a special treatment of poly-ε-caprolactam particles such as chips, granules, and the like, which will be hereinafter referred to as granules. This treatment consists of subjecting the granules to the action of (1) hydrogen halides, alkali salts or salts of the alkaline-earth metals thereof, (2) aliphatic amines containing 14–72 carbon atoms, and (3) metallic soaps of fatty acids containing 14–24 carbon atoms and having an atomic weight range of 56–65. The foregoing treatments can be conducted in any desired sequence or, in other words, in a random succession of treatments, which will be explained in more detail hereinafter.

The granules may first be impregnated with an aqueous solution of hydrogen chloride, hydrogen iodide, or hydrogen bromide or alkali salts or salts of the alkaline-earth metals thereof, whereafter the granules are dried. The granules thus pretreated may be successively coated if necessary at an elevated temperature with long chain aliphatic amines containing 14–72 carbon atoms and with soaps of the metals having the proper atomic weight, e.g. iron, cobalt, nickel, copper, or zinc. Alternatively, in the second step the granules may be coated with a mixture of amines and soaps. The metallic soap that is preferred is the zinc soap, since apparently it is most effective in preparing a substantially transparent and non-milky product.

Another procedure which has been found to be effective is that the granules may be first coated with a mixture of an aqueous solution of a hydrogen halide or alkali salts or salts of the alkaline-earth metals thereof, with an aliphatic amine and subsequently expelling the water from the solution. The granules thus pretreated may be coated with metallic soaps. It is also possible to combine these steps by coating the granules with the said mixture and the metallic soaps in one operation.

In order to obtain the proper transparency, only minute amounts of the substances are required. It has been determined that very good results are obtained if the poly-ε-caprolactam granules are treated with aqueous solutions in such concentrations that the granules are coated with 0.01–0.5% by weight of halogen in the form of halogen compounds, 0.1–1.0% by weight of aliphatic amines, and 0.05–0.5% by weight of the soaps. Any higher percentages than those specified do not impart any additional improvement and therefore the use of the higher percentages is undesirable from the standpoint of economy.

The aliphatic amines that may be used effectively according to the present invention are tetradecylamine, octadecylamine, tetracosylamine, diheptylamine, dioctylamine, didecylamine, dioctadecylamine, dimethyldodecylamine, dimethyloctadecylamine, methyldioctadecylamine, and tritetracosylamine. From a commercial standpoint, the most suitable is octadecylamine, because it is inexpensive and readily available on the open market.

An additional advantage of these treatments is that filaments manufactured from poly-ε-caprolactam are not only transparent but they can be drawn to a higher degree whereby a considerable increase in strength is realized.

Poly-ε-caprolactam granules treated according to this invention can be processed in several ways, namely, they can be shaped into monofilaments by means of a screw extruder and subsequently drawn to the desired extent. The granules can also be processed to molded products by means of injection molding machines or extruders. Transparent films or bottles may also be manufactured by this process.

The following examples will serve to give a clearer understanding of the present process, although the invention is not to be restricted thereby.

EXAMPLE I

Polyamide granules were prepared by polymerizing ε-caprolactam in the presence of acetic acid as a stabilizer and divided into several lots which were mixed, according to Table I, with aqueous solutions of various alkali salts and salts of the alkaline-earth metals of halogens. After they had been mixed, the granules were dried. The granules of the different lots were subsequently mixed at 90° C. with various aliphatic amines and various metallic soaps. The granules so treated were shaped into monofilaments 1.5 mm. in diameter by means of a screw extruder. The freshly extruded filaments, after they had passed through an air zone of 3 cm., were led through a bath containing water at room temperature and subsequently wound. The results are given in Table I. The control has had nothing added and therefore the transparency of the products is indicated by the symbol "0." The degree of increasing transparency of the products is indicated by "+" signs.

Table I

| Lot | Admixtures | | | Transparency of the monofilament |
|---|---|---|---|---|
| 1 | Control (no admixture). | | | 0 |
| 2 | Potassium iodide: | Octadecylamine: 0.5% by weight. | Copper stearate: 0.1% by weight. | |
| | a. | | | + |
| | b. 0.05% by wt. | ...do... | ...do... | +++ |
| | c. 0.45% by wt. | ...do... | ...do... | ++ |
| 3 | Sodium chloride: | | Zinc stearate: 0.1% by wt. | |
| | a. | ...do... | ...do... | + |
| | b. 0.05% by wt. | ...do... | ...do... | +++++ |
| | c. 0.45% by wt. | ...do... | ...do... | ++++ |
| 4 | Sodium iodide: 0.05% by wt. | ...do... | ...do... | ++++ |
| 5 | Barium bromide: | Octadecylamine: 0.5% by wt. | Iron stearate: 0.1% by wt. | |
| | a. | ...do... | ...do... | + |
| | b. 0.05 by wt. | ...do... | ...do... | +++ |
| | c. 0.45% by wt. | ...do... | ...do... | ++ |
| 6 | Calcium chloride: | Octadecylamine: 0.5% by wt. | Zinc stearate: 0.1% by wt. | |
| | a. | ...do... | ...do... | + |
| | b. 0.05% by wt. | ...do... | ...do... | +++ |
| | c. 0.45% by wt. | ...do... | ...do... | ++ |
| 7 | Sodium chloride: | | | |
| | a. 0.05% by wt. | | 0.1% by wt. | 0 |
| | b. 0.05% by wt. | 0.2% by wt. | ...do... | ++++++ |
| | c. 0.05% by wt. | 0.5% by wt. | ...do... | +++++ |
| | d. 0.05% by wt. | 1.0% by wt. | ...do... | +++ |
| 8 | Sodium chloride: | Tetradecylamine: 0.5% by wt. | Zinc stearate: 0.1% by wt. | |
| | a. 0.05% by wt. | | | ++++ |
| | b. 0.05% by wt. | Tetracosylamine: 0.5% by wt. | ...do... | ++++++ |
| | c. 0.05% by wt. | Dioctadecylamine: 0.5% by wt. | ...do... | ++++++ |
| | d. 0.05% by wt. | Methyldioctadecylamine: 0.5% by wt. | ...do... | +++ |
| 9 | | Octadecylamine: 0.5% by wt. | Zinc stearate: | |
| | a. 0.05% by wt. | ...do... | | 0 |
| | b. 0.05% by wt. | ...do... | 0.1% by wt. | +++++ |
| | c. 0.05% by wt. | ...do... | 0.25% by wt. | +++ |
| | d. 0.05% by wt. | ...do... | 0.5% by wt. | ++ |
| 10 | | | Salt of zinc and myristic acid: | |
| | a. 0.05% by wt. | ...do... | 0.25% by wt. | ++++ |
| | b. 0.05% by wt. | ...do... | Salt of zinc and behenic acid: 0.25% by wt. | ++++++ |

EXAMPLE II

Hydrogen chloride, hydrogen iodide, and sodium chloride dissolved in water at 90° C. were mixed with equivalent amounts of octadecylamine. The three mixtures thus obtained were freed from water by drying. They were then separately mixed at 95° C. with zinc stearate and polyamide granules prepared by polymerization of ε-caprolactam in the presence of phosphoric acid as a stabilizer.

The granules thus treated were shaped into monofilaments measuring 1.5 mm. across by means of a screw extruder. The freshly extruded filaments were successively passed through an air zone of 4 cm., a bath of water, and subsequently wound. The results are shown in Table II.

Table II

| Lot | Admixtures | | Transparency |
|---|---|---|---|
| 11 | Octadecylamine/HCl: | Zinc stearate: | |
| | a. 0.2% by wt. | 0.1% by wt. | ++++ |
| | b. 0.5% by wt. | ...do... | +++++ |
| | Octadecylamine/HJ: | | |
| | c. 0.2% by wt. | ...do... | ++++++ |
| | d. 0.5% by wt. | ...do... | ++++++ |
| | Octadecylamine/NaCl: | | |
| | e. 0.5% by wt. | ...do... | ++++++ |

What is claimed is:

1. A process for preparing transparent articles from poly-ε-caprolactam which comprises treating poly-ε-caprolactam granules with the following materials: (1) compounds of the class consisting of hydrogen halides and alkali salts thereof, (2) aliphatic amines of the class consisting of octadecylamine, tetradecylamine, tetracosylamine, dioctadecylamine, and methyldioctadecylamine, and (3) zinc stearate, said treatments being in any order of succession and combination.

2. A process according to claim 1 wherein the second and third steps are combined.

3. A process according tgo claim 1 wherein the first and second steps are combined.

4. A process according to claim 1 wherein all three steps are combined.

5. A process according to claim 1 wherein a hydrogen halide is used.

6. A process according to claim 1 wherein a sodium salt is used.

7. A process according to claim 1, wherein the granules are treated so that they contain 0.01–0.5% by weight of halogen in the form of halogen compounds, 0.1–1.0% by weight of aliphatic amines, and 0.05–0.5% by weight of zinc stearate.

8. A process according to claim 7, wherein the amine is octadecylamine.

References Cited by the Examiner

UNITED STATES PATENTS

| | | | |
|---|---|---|---|
| 2,405,008 | 7/1946 | Berry et al. | 260—45.9 |
| 2,705,227 | 3/1955 | Stamatoff | 260—18 |
| 2,829,121 | 4/1958 | Leeper | 260—45.9 |
| 2,855,267 | 10/1958 | Zimmermann | 8—115.5 |
| 2,856,373 | 10/1958 | Lowery et al. | 260—18 |
| 2,889,211 | 6/1959 | Rodenacker et al. | 260—45.9 |

LEON J. BERCOVITZ, *Primary Examiner.*

MILTON STERMAN, *Examiner.*